United States Patent
Ju et al.

(10) Patent No.: US 12,165,351 B2
(45) Date of Patent: Dec. 10, 2024

(54) METHOD AND APPARATUS WITH POSE ESTIMATION

(71) Applicant: Samsung Electronics Co., Ltd., Suwon-si (KR)

(72) Inventors: Hojin Ju, Suwon-si (KR); Yun-Tae Kim, Suwon-si (KR); Donghoon Sagong, Suwon-si (KR); Jaehwan Pi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 17/584,682

(22) Filed: Jan. 26, 2022

(65) Prior Publication Data

US 2023/0035458 A1    Feb. 2, 2023

(30) Foreign Application Priority Data

Jul. 29, 2021   (KR) .......................... 10-2021-0100131

(51) Int. Cl.
*G06T 7/70*   (2017.01)
*G02B 27/01*   (2006.01)
(Continued)

(52) U.S. Cl.
CPC ............ *G06T 7/70* (2017.01); *G02B 27/0172* (2013.01); *G06T 7/248* (2017.01); *G06T 19/006* (2013.01);
(Continued)

(58) Field of Classification Search
None
See application file for complete search history.

(56) References Cited

U.S. PATENT DOCUMENTS 7,336,830 B2 *   2/2008   Porter .................. H04N 23/611
                                                          382/218
7,522,772 B2 *   4/2009   Porter .................. G06V 40/161
                                                          382/218
(Continued)

FOREIGN PATENT DOCUMENTS

KR   10-2015-0114892 A   10/2015
KR   10-2018-0108629 A   10/2018
(Continued)

OTHER PUBLICATIONS

Li, Peiliang, et al. "Monocular visual-inertial state estimation for mobile augmented reality." 2017 IEEE international symposium on mixed and augmented reality (ISMAR). IEEE, 2017. (Year: 2017).*

(Continued)

*Primary Examiner* — Michelle M Entezari Hausmann
(74) *Attorney, Agent, or Firm* — NSIP Law

(57) ABSTRACT

A processor-implemented method with pose estimation includes: tracking a position of a feature point extracted from image information comprising a plurality of image frames, the image information being received from an image sensor; predicting a current state variable of an estimation model for determining a pose of an electronic device, based on motion information received from a motion sensor; determining noise due to an uncertainty of the estimation model based on a residual between a first position of the feature point extracted from the image frames and a second position of the feature point predicted based on the current state variable; updating the current state variable based on the current state variable, the tracked position of the feature point, and the noise; and determining the pose of the electronic device based on the updated current state variable.

26 Claims, 8 Drawing Sheets

(51) Int. Cl.
  *G06T 7/246* (2017.01)
  *G06T 19/00* (2011.01)
(52) U.S. Cl.
  CPC .............. *G02B 2027/0178* (2013.01); *G06T 2207/20024* (2013.01)

(56) References Cited

U.S. PATENT DOCUMENTS

| | | | |
|---|---|---|---|
| 9,437,005 | B2* | 9/2016 | Tateno ............... B25J 9/1697 |
| 10,324,195 | B2 | 6/2019 | Garin et al. |
| 10,371,530 | B2 | 8/2019 | Ramanandan et al. |
| 10,890,600 | B2 | 1/2021 | Li et al. |
| 11,238,340 | B1* | 2/2022 | Anderson ............. G06N 3/02 |
| 11,904,482 | B2* | 2/2024 | Jiang ............... B25J 9/1692 |
| 2014/0168268 | A1* | 6/2014 | Oi ...................... G06T 7/70 382/106 |
| 2019/0041979 | A1* | 2/2019 | Kirchner ............ B64D 43/00 |
| 2021/0055545 | A1* | 2/2021 | Rodgers ............. G06N 3/04 |
| 2021/0190499 | A1* | 6/2021 | Palella .............. G01C 21/165 |

FOREIGN PATENT DOCUMENTS

| | | |
|---|---|---|
| KR | 10-2044491 B1 | 11/2019 |
| KR | 10-2020-0005999 A | 1/2020 |
| KR | 10-2020-0097292 A | 8/2020 |
| KR | 10-2020-0109116 A | 9/2020 |

OTHER PUBLICATIONS

Straszewski, Wojciech, Magdalena Drozdz, and Hendrik Wouters. "Automated tuning of Kalman filter: Kalman filter tuning in the Windows Azure Cloud environment." 2018 IEEE International Symposium on Inertial Sensors and Systems (Inertial). IEEE, 2018. (Year: 2018).*

Mirzaei, Faraz M., and Stergios I. Roumeliotis. "A Kalman filter-based algorithm for IMU-camera calibration: Observability analysis and performance evaluation." IEEE transactions on robotics 24.5 (2008): 1143-1156. (Year: 2008).* www.wikipedia.com search: Extended Kalman filter (Year: 2024).*

Bleser, Gabriele, Harald Wuest, and Didier Stricker. "Online camera pose estimation in partially known and dynamic scenes." 2006 IEEE/ACM International Symposium on Mixed and Augmented Reality. IEEE, 2006. (Year: 2006).*

Shademan, Azad, and Farrokh Janabi-Sharifi. "Sensitivity analysis of EKF and iterated EKF pose estimation for position-based visual servoing." Proceedings of 2005 IEEE Conference on Control Applications, 2005. CCA 2005.. IEEE, 2005. (Year: 2005).*

Janabi-Sharifi, Farrokh, and Mohammed Marey. "A kalman-filter-based method for pose estimation in visual servoing." IEEE transactions on Robotics 26.5 (2010): 939-947. (Year: 2010).*

Huai, Jianzhu, et al. "Observability analysis and keyframe-based filtering for visual inertial odometry with full self-calibration." IEEE Transactions on Robotics 38.5 (2022): 3219-3237. (Year: 2022).*

Yang, Xin, et al. "[Poster] Fusion of Vision and Inertial Sensing for Accurate and Efficient Pose Tracking on Smartphones." 2015 IEEE International Symposium on Mixed and Augmented Reality. IEEE, 2015, (4 pages in English).

Li, Mingyang, et al., "High-precision, consistent EKF-based visual-inertial odometry." The International Journal of Robotics Research 32.6 (2013): 690-711., (22 pages in English).

Extended European search report issued on Oct. 12, 2022, in counterpart European Patent Application No. 22164546.8 (4 pages in English).

Zanetti, Renato, et a. "On Underweighting Nonlinear Measurements." *Journal of guidance, control, and dynamics* vol. 33 Issue 5 2010 (17 pages in English).

Sun, Ke, et al. "Robust Stereo Visual Inertial Odometry for Fast Autonomous Flight." *IEEE Robotics and Automation Letters* vol. 3 Issue 2 arXiv:1712.00036v3 Jan. 10, 2018 (8 pages in English).

* cited by examiner

METHOD AND APPARATUS WITH POSE ESTIMATION

CROSS-REFERENCE TO RELATED APPLICATIONS

This application claims the benefit under 35 USC § 119(a) of Korean Patent Application No. 10-2021-0100131, filed on Jul. 29, 2021 in the Korean Intellectual Property Office, the entire disclosure of which is incorporated herein by reference for all purposes.

BACKGROUND

1. Field

The following description relates to a method and apparatus with pose estimation.

2. Description of Related Art

Certain electronic devices may implement virtual reality (VR), augmented reality (AR), or mixed reality (MR). Among them, the AR is a display technology that may combine and display virtual objects or information on an environment of the real world. The AR may be variously used in, for example, a ubiquitous environment or an Internet of things (IoT) environment. The AR may deliver a variety of information more realistically to a user through a combination of an external view and a virtual image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with pose estimation includes: tracking a position of a feature point extracted from image information comprising a plurality of image frames, the image information being received from an image sensor; predicting a current state variable of an estimation model for determining a pose of an electronic device, based on motion information received from a motion sensor; determining noise due to an uncertainty of the estimation model based on a residual between a first position of the feature point extracted from the image frames and a second position of the feature point predicted based on the current state variable; updating the current state variable based on the current state variable, the tracked position of the feature point, and the noise; and determining the pose of the electronic device based on the updated current state variable.

The determining of the noise may include: determining the residual between the first position of the feature point extracted from a current image frame among the image frames and the second position of the feature point predicted based on the current state variable; and determining the noise due to the uncertainty of the estimation model based on the residual.

The determining of the noise may include determining the noise by expressing, as a sum of a ground-truth and an error, the residual between the first position of the feature point extracted from the current image frame and the second position of the feature point predicted based on the current state variable.

The determining of the noise may include determining the noise by approximating a result of expressing the residual as the sum of the ground-truth and the error, using a tuning parameter of the estimation model.

The uncertainty of the estimation model may be determined using an estimation covariance according to a simultaneous localization and mapping (SLAM) technique based on an extended Kalman filter.

The predicting of the current state variable may include predicting, based on the motion information and a previous state variable corresponding to a previous image frame among the image frames, an error covariance of the previous state variable and the current state variable corresponding to a current image frame among the image frames.

The updating of the current state variable may include updating the current state variable based on the current state variable, the error covariance of the previous state variable, the tracked position of the feature point, and the noise.

The tracking of the position of the feature point may include: extracting a second feature point included in a current image frame among the image frames; and tracking a position of the second feature point through matching between a first feature point extracted from a previous image frame before the current image frame among the image frames and the second feature point.

The estimation model may include an estimation model using a filter-based visual-inertial odometry (VIO).

The electronic device may include either one or both of: a wearable device comprising a smart glass; and a head-mounted device (HMD) comprising any one or any combination of any two or more of an augmented reality (AR) device, a virtual reality (VR) device, and a mixed reality (MR) device.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with pose estimation includes: an image sensor configured to sense image information comprising a plurality of image frames; a motion sensor configured to sense motion information of an electronic device; and one or more processors configured to: track a feature point by extracting the feature point from the image information; predict a current state variable of an estimation model for determining a pose of the electronic device based on the motion information; determine noise due to an uncertainty of the estimation model based on a residual between a first position of the feature point extracted from the image frames and a second position of the feature point predicted based on the current state variable; update the current state variable based on the current state variable, a position of the tracked feature point, and the noise; and determine the pose of the electronic device based on the updated current state variable.

For the determining of the noise, the one or more processors may be configured to: determine the residual between the first position of the feature point extracted from a current image frame among the image frames and the second position of the feature point predicted based on the current state variable; and determine the noise due to the uncertainty of the estimation model based on the residual.

For the determining of the noise, the one or more processors may be configured to determine the noise by expressing, as a sum of a ground-truth and an error, the residual between the first position of the feature point extracted from the current image frame and the second position of the feature point predicted based on the current state variable.

For the determining of the noise, the one or more processors may be configured to determine the noise by approximating a result of expressing the residual as the sum of the ground-truth and the error, using a tuning parameter of the estimation model.

The uncertainty of the estimation model may be determined using an estimation covariance according to a simultaneous localization and mapping (SLAM) technique based on an extended Kalman filter.

For the predicting of the current state variable, the one or more processors may be configured to predict, based on the motion information and a previous state variable corresponding to a previous image frame among the image frames, an error covariance of the previous state variable and the current state variable corresponding to a current image frame among the image frames.

For the updating of the current state variable, the one or more processors may be configured to update the current state variable based on the current state variable, the error covariance of the previous state variable, the position of the tracked feature point, and the noise.

For the tracking of the position of the feature point, the one or more processors may be configured to: extract a second feature point included in a current image frame among the image frames; and track a position of the second feature point through matching between a first feature point extracted from a previous image frame before the current image frame among the image frames and the second feature point.

The estimation model may include an estimation model using a filter-based visual-inertial odometry (VIO).

The electronic device may include either one or both of: a wearable device comprising a smart glass; and a head-mounted device (HMD) comprising any one or any combination of any two or more of an augmented reality (AR) device, a virtual reality (VR) device, and a mixed reality (MR) device.

In another general aspect, a wearable electronic device includes: an image sensor configured to sense image information comprising a plurality of image frames; a motion sensor configured to sense motion information of the wearable electronic device; one or more processors configured to: track a feature point by extracting the feature point from the image information; predict a current state variable of an estimation model for determining a pose of the wearable electronic device based on the motion information; determine noise due to an uncertainty of the estimation model based on a residual between a first position of the feature point extracted from the image frames and a second position of the feature point predicted based on the current state variable; update the current state variable based on the current state variable, a position of the tracked feature point, and the noise; determine the pose of the wearable electronic device based on the updated current state variable; and generate virtual content based on the determined pose; and a display configured to display the virtual content.

In another general aspect, a processor-implemented method with pose estimation includes: predicting a current state variable of an estimation model for determining a pose of an electronic device; determining noise due to an uncertainty of the estimation model based on a residual between a first position of a feature point extracted from image frames and a second position of the feature point predicted based on the current state variable; updating the current state variable based on the noise; and determining the pose of the electronic device based on the updated current state variable.

The current state variable may include a state variable corresponding to a motion sensor and a state variable corresponding to an image sensor.

The state variable corresponding to the motion sensor may include any one or any combination of any two or more of an orientation error of an image frame among the image frames, a bias error of the motion sensor, a velocity error, an acceleration bias error, and a position error.

The state variable corresponding to the image sensor may include an error of a position of a feature point viewed at an image frame of the image frames.

Other features and aspects will be apparent from the following detailed description, the drawings, and the claims.

Figure 1:
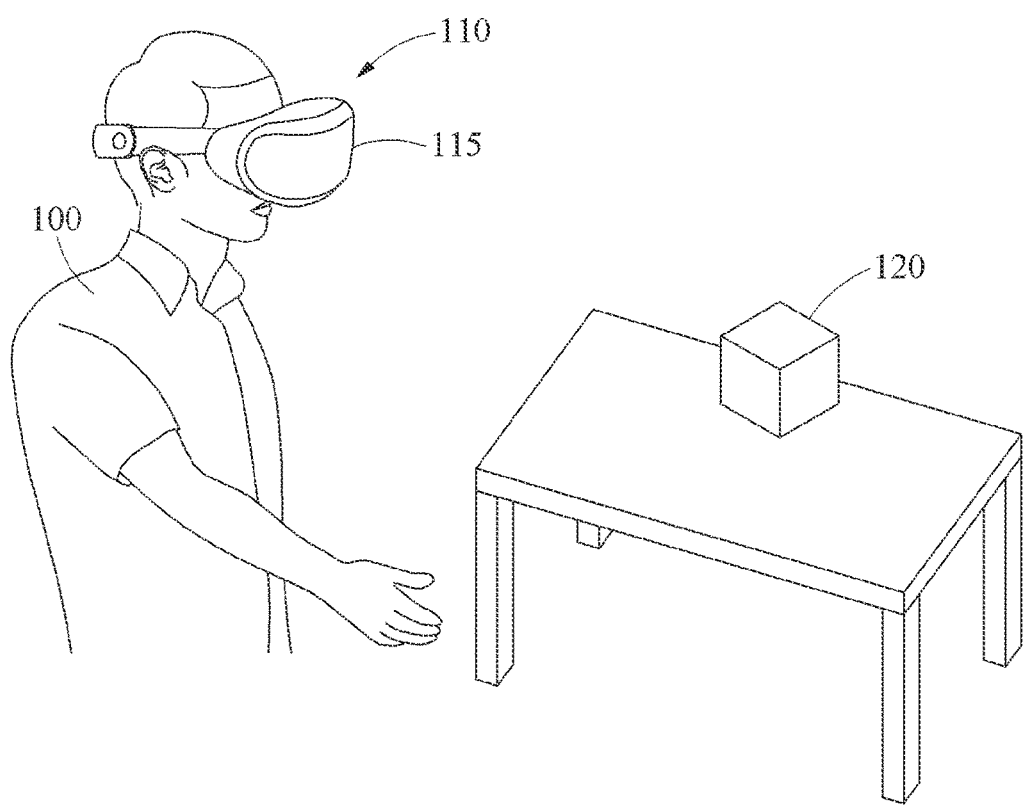
FIGS. 1 and 2 are diagrams illustrating examples of an overview of an electronic device that provides an augmented reality (AR).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a", "an", and "the" are intended to include the plural forms as well, unless the context clearly indicates otherwise. As used herein, the term "and/or" includes any one and any combination of any two or more of the associated listed items. It should be further understood that the terms "comprises," "includes," and "has" specify the presence of stated features, numbers, integers, steps, operations, elements, components, and/or combinations thereof, but do not preclude the presence or addition of one or more other features, numbers, integers, steps, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which e this disclosure pertains and based on an understanding of the disclosure of the present application. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

Figure 2:
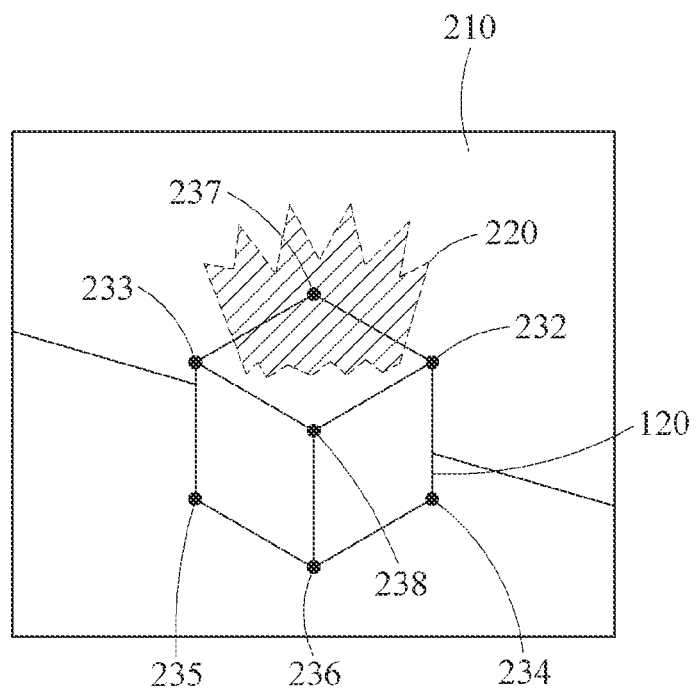

FIGS. 1 and 2 are diagrams illustrating examples of an overview of an electronic device that provides an augmented reality (AR).

Referring to FIG. 1, an electronic device 110 is a device that provides an AR service to a user 100. The AR service is a service that may superimpose a virtual image or virtual content on an image or view of a real world viewed by the user 100. The electronic device 110 may use a display 115 to provide the user 100 with a virtual image (e.g., a virtual object 220 of FIG. 2) including content related to a real object 120 of the real world together with the real object 120 of the real world. The virtual image viewed by the user 100 may be a two-dimensional (2D) image or a three-dimensional (3D) image. In addition, the virtual image may be a static image without movement or a dynamic image with movement such as animation. The electronic device 110 may be a wearable device to be worn on the user 100. The electronic device 110 may be, for example, a wearable electronic device such as a head-mounted display (HMD) including a smart glass, a virtual reality (VR) headset, and/or an AR headset and a face-mounted display (FMD), but is not limited thereto.

FIG. 2 illustrates an example of AR content 210 provided through the display 115 of the electronic device 110. For ease of description, the following description will be made based on an example in which virtual content provided by the electronic device 110 is the AR content 210, and this does not preclude the provision of VR content and/or MR content.

The electronic device 110 may create (e.g., generate) the AR content 210 by matching a virtual object 220 including virtual information and the real object 120 of the real world viewed by the user 100. The AR content 210 may be, for example, a replication of a realistic virtual object from the real object 120 of the real world, and/or an implementation of a virtual computer graphic effect on the real object 120 of the real world. The virtual computer graphic effect may be, for example, a virtual image obtained by implementing, on a real mechanical device, additional information such as a user manual and/or additional content such as a virtual character explaining the user manual, but is not limited thereto.

For example, when the user 100 moves a head or a line of sight, a gaze direction of the user 100 looking at the real object 120 may change. The electronic device 110 may precisely adjust the virtual object 220 according to a change in the gaze direction, thereby providing the AR content 210 to the user 100 with high precision. The electronic device 110 may match the real object 120 and the virtual object 220 naturally by precisely measuring the change in the gaze direction. The electronic device 110 may realistically implement the AR content 210 by expressing the virtual object 220 at the exact position corresponding to the real object 120 in a scene that the user 100 gazes the real object 120.

The electronic device 110 may perform the below-described pose estimation method by itself (for example, the electronic device may be or include a pose estimation apparatus 800 of FIG. 8), or may receive a pose estimated (e.g., determined) by a pose estimation apparatus (for example, the pose estimation apparatus 800 of FIG. 8). The pose estimation apparatus may perform localization of the electronic device 110. A result of the localization of the electronic device 110 may be used to estimate a head movement of the user 100 or the gaze direction of the user 100. A pose of the electronic device 110 determined by the pose estimation apparatus may include information on a position and an orientation of the electronic device 110. The pose of the electronic device 110 may be represented based on, for example, six degrees of freedom (6DoF), as a non-limiting example. The pose of the electronic device 110 may correspond to a pose of the user 100 wearing the electronic device 110 or a pose of an image sensor (e.g., a camera) included in the electronic device 110.

The pose estimation apparatus may determine the pose of the electronic device 110 using image information (e.g., image frames 301 of FIG. 3) acquired by an image sensor and motion information (e.g., inertial measurement unit (IMU) sensor data) acquired by a motion sensor. By using the image information and the motion information together to determine the pose of the electronic device 110, the pose estimation apparatus of one or more embodiments may determine the pose of the electronic device 110 with increased accuracy and effectiveness, compared to a typical pose estimation apparatus that may estimate the pose using either one but not both of the image information and the motion information. The image sensor and the motion sensor may be included in the electronic device 110. The image sensor may acquire the image information by capturing at least a partial area (e.g., a front area of the user 100) of an ambient or surrounding area of the electronic device 110. The motion sensor may measure a movement of the electronic device 110 or the user 100. The motion sensor may include, for example, an IMU including an acceleration sensor and a gyro sensor, but is not limited thereto.

The pose estimation apparatus may extract feature points 232, 233, 234, 235, 236, 237, and 238 of the real object 120 from image information obtained by capturing the real object 120. Also, the pose estimation apparatus may track positions of feature points through mapping between the extracted feature points 232, 233, 234, 235, 236, 237, and 238 and reference feature points of the real object 120 defined or determined in advance as priori information. The priori information may include 3D coordinate information of reference feature points on a surface of the real object 120 making a reference pose. The "feature point" may also be referred to as a "landmark."

The pose estimation apparatus may predict a state variable of an estimation model estimating a position of a feature point(s) by applying a motion made in a period of time from previous to present to a position of the electronic device 110 corresponding to the previous time.

Figure 3:
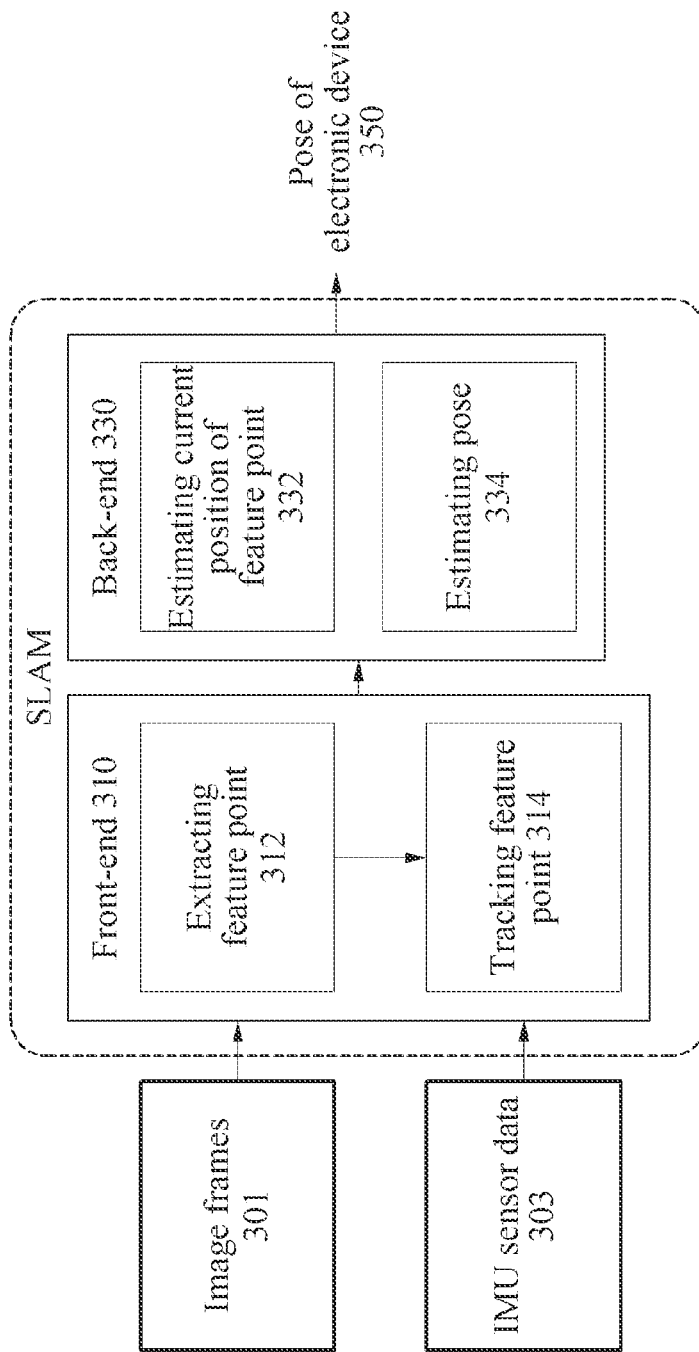
FIG. 3 is a diagram illustrating an example of a method of estimating a pose.

FIG. 3 is a diagram illustrating an example of a method of estimating a pose. FIG. 3 illustrates a configuration for a pose estimation apparatus to estimate a pose using a simultaneous localization and mapping (SLAM) technique based on a visual-inertial odometry (VIO).

The VIO may correspond to technology for estimating position, velocity, and/or orientation values of a corresponding device by fusing image information (e.g., image frames 301) acquired through an image sensor such as a camera and motion information (e.g., IMU sensor data 303) acquired by an IMU sensor. The "image information" may correspond to an image acquired from an image sensor such as a camera. The camera may detect a relatively accurate motion at a slow movement in contrast to the IMU sensor. The "motion information" may correspond to information obtained by measuring a motion applied to the IMU sensor. For example, the motion information may include force, acceleration, and/or rotation applied from an accelerometer and a gyroscope in the IMU to a corresponding device.

The SLAM may correspond to technology for estimating a position by performing localization and mapping simultaneously. The SLAM may use the VIO that uses both image information and motion information as an element technology.

The VIO may be used when the localization that estimates a position in real time is performed in the SLAM.

A VIO-based SLAM used in the pose estimation apparatus may include two parts, for example, a front-end 310 and a back-end 330.

At the front-end 310, the pose estimation apparatus may extract a feature point from image information (e.g., the image frames 301) as indicated by a block 312. The "feature point" may indicate a point having a distinctive color or brightness change in the image frames 301 so that an overall image characteristic is represented. As indicated by a block 314, at the front-end 310, the pose estimation apparatus may track the same feature point through matching between feature points in the image frames 301 captured consecutively. Information obtained by tracking the matching feature points may be used to estimate a pose (e.g., of the electronic device 110) by the pose estimation apparatus at the back-end 330.

At the back-end 330, the pose estimation apparatus may estimate a current position of a feature point based on the matching feature points received from the front-end 310 and the motion information (e.g., the IMU sensor data 303) acquired by the IMU sensor, as indicated by a block 332. Also, the pose estimation apparatus may estimate the pose based on the estimated current position of the feature point as indicated by a block 334. The pose estimation apparatus may output the estimated pose in real time as indicated by reference numeral 350.

At the back-end 330, the pose estimation apparatus may estimate the pose based on an estimation model using the motion information and feature points found in a previous image frame and a current image frame for each image frame by a recursive filter scheme. As the estimation model, various estimation models based on a Kalman filter, for example, an extended Kalman filter (EKF), an unscented Kalman filter (UKF), and/or an extended information filter (EIF) may be used. For ease of description, the following description will be made based on an operation of an EKF-based estimation model, and this is merely an example. The Kalman filter may estimate a pose by repetitively performing a state prediction and a measurement update. The EKF may correspond to a scheme of using the Kalman filter by extending the Kalman filter to a nonlinear model.

The pose estimation apparatus of one or more embodiments may increase an operation efficiency using the filter-based VIO that estimates a pose repetitively for each frame. Thus, the pose estimation apparatus of one or more embodiments may more accurately estimate a position even in the AR and VR devices that may be limited to a small amount of computational operation.

Figure 4:
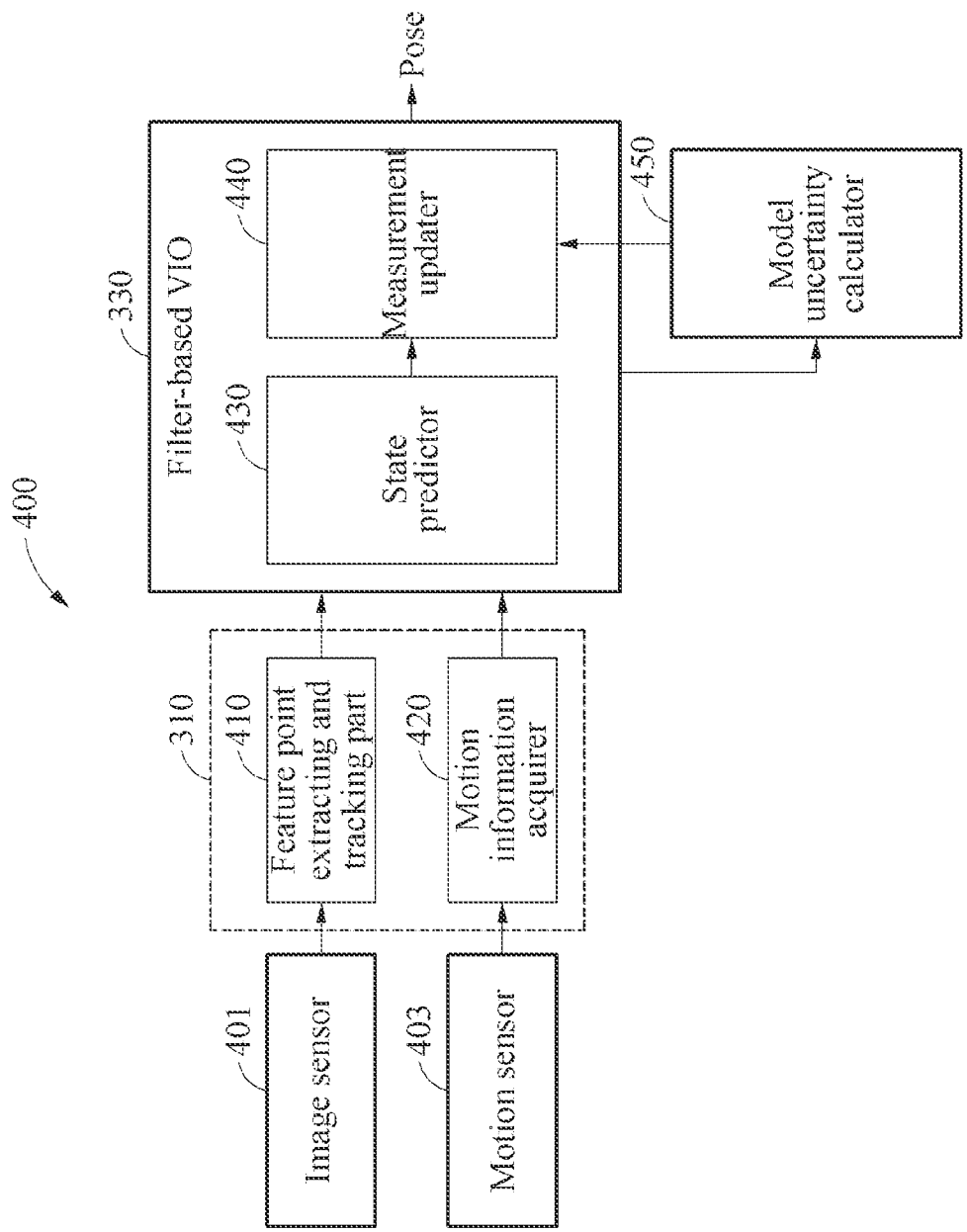
FIG. 4 is a diagram illustrating an example of an operation of a pose estimation apparatus.

FIG. 4 is a diagram illustrating an example of an operation of a pose estimation apparatus. Referring to FIG. 4, a pose estimation apparatus 400 may include an image sensor 401, a motion sensor 403, a feature point extracting and tracking part 410, a motion information acquirer 420, a state predictor 430, a measurement updater 440, and a model uncertainty calculator 450.

The feature point extracting and tracking part 410 and the motion information acquirer 420 may correspond to the front-end 310. The motion information acquirer 420, the state predictor 430, the measurement updater 440, and the model uncertainty calculator 450 may correspond to the back-end 330.

The pose estimation apparatus 400 may estimate a pose through, for example, a state prediction and a measurement update performed by an estimation model using a filter-based VIO. As inaccuracy of the estimation model increases, a pose estimation accuracy may decrease.

The pose estimation apparatus 400 of one or more embodiments may prevent the decrease of the pose estimation accuracy by accounting for an uncertainty of the estimation model.

The pose estimation apparatus 400 may receive image information (e.g., image frames) captured by the image sensor 401 and inertial sensor information sensed by the motion sensor 403.

The feature point extracting and tracking part 410 may extract at least one feature point from image information (e.g., a current image frame) and match the feature point extracted from the current image frame and a feature point extracted from a previous image frame, thereby tracking the feature point of the current image frame.

The motion information acquirer 420 may acquire the inertial sensor information sensed by the motion sensor 403 as motion information.

The motion information acquired by the motion information acquirer 420 may be used in the state predictor 430, and information on the feature point tracked by the feature point extracting and tracking part 410 may be used in the measurement updater 440.

The estimation model according to the filter-based VIO may include the state predictor 430 and the measurement updater 440.

The measurement updater 440 may update a measurement (e.g., a position (e.g., a current position) of the feature point) based on the information on the feature point tracked by the feature point extracting and tracking part 410 and the estimation model. The estimation model may be associated with a 3D position of the feature point being tracked and thus, may include an error. In an example, the pose estimation apparatus 400 of one or more embodiments may calculate and reflect the uncertainty of the estimation model when updating the measurement, thereby improving a performance of the estimation model and the pose estimation apparatus 400.

The pose estimation apparatus 400 may set numerous elements used for estimating a pose of the electronic device to be state variables of the estimation model and perform estimation in real time.

For example, a state variable $x_I$ related to the motion sensor 403 may be expressed as shown in Equation 1 below, for example.

$$x_I = \epsilon\ \delta b_g\ \delta v\ \delta b_a\ \delta p)$$  Equation 1:

In Equation 1, $\epsilon$ denotes an orientation error of a corresponding image frame compared to a reference image frame and $\delta b_g$ denotes a bias error of a gyro sensor. In addition, $\delta v$ denotes a velocity error, $\delta b_a$ denotes an acceleration bias error, and $\delta p$ denotes a position error.

In certain non-limiting examples, the state variable $x_I$ related to the motion sensor 403 may further include an extrinsic parameter between the image sensor 401 and the motion sensor 403, an acceleration, a gyro scale factor, and the like. In addition, in certain non-limiting examples, a 3D position error of the feature point may also be included in the state variable $x_I$ related to the motion sensor 403.

In an example, a position error of the feature point viewed at the image frame acquired by the image sensor 401 may be estimated as a state variable $x_F$ related to the image sensor 401 or the image frame as shown in Equation 2 below, for example.

$$x_F = (\delta^c p_{f_1}\ \delta^c p_{f_2} \ldots \delta^c p_{f_N})$$  Equation 2:

In Equation 2, $\delta^c p_{f_N}$ may correspond to an error of a position of an N-th feature point viewed at an image frame captured by a camera.

$$^c p_{f_j} = \begin{bmatrix} ^c X_j \\ ^c Y_j \\ ^c Z_j \end{bmatrix}^T$$  Equation 3

In Equation 3, $^c p_{f_j}$ may correspond to a position of a j-th feature point viewed at an image frame captured by the camera, and $^c X_j$, $^c Y_j$, and $^c Z_j$ may correspond to 3D position coordinates (x, y, z) of the j-th feature point viewed at the image frame.

An overall state variable x of the estimation model may be expressed as shown in Equation 4 below, for example, and estimated values may be changed by a state variable according to a filter design.

$$x = (x_I\ x_F)^T$$  Equation 4:

The pose estimation apparatus 400 may estimate a pose based on a probabilistic model, for example, a filter-based estimation model. An operation of the filter-based estimation model may be divided into a state prediction and a measurement update.

The state predictor 430 may predict a current state variable and a probability distribution (e.g., an estimation covariance of a previous state variable) through an input (e.g., a position, a velocity, an orientation, etc.) of the motion sensor 403 and values being estimated.

The state predictor 430 may update the current state variable predicted based on the previous state variable estimated based on the previous image frame. The estimation model may remove an error based on a feedback structure when updating a measurement (e.g., a position of a feature point). Thus, the state predictor 430 may perform a prediction on a probability distribution without performing an update for an error value.

For example, the state predictor 430 may predict the current state variable through Equation 5 below, for example.

$$P_{k+1} = \Phi_k P_k \Phi_k^T + Q_k$$  Equation 5:

In Equation 5, $P_k$ denotes an error covariance of a state variable at a point in time k, $\Phi_k$ denotes a system model (an estimation model), and $Q_k$ may correspond to system noise. The system noise $Q_k$ may be determined by an error characteristic of the motion sensor (e.g., the IMU sensor).

The measurement updater 440 may estimate the current state variable using information on a feature point extracted from a current image frame and an error covariance of previous state information predicted by the state predictor 430.

The measurement updater 440 may update the current state variable by reflecting a difference r between an actual measurement (a position of the feature point) and a measurement (a position of the feature point) predicted based on the previous state variable estimated based on the previous image frame. At this time, a residual r corresponding to the difference between the actual measurement and the predicted measurement may be expressed as shown in Equation 6 below, for example.

$$r = Hx + v$$  Equation 6:

In Equation 6, H denotes an estimation model and v denotes measurement noise (or error).

In an example, an error due to an uncertainty of the estimation model may be taken into consideration as the measurement noise, that is, noise of the measurement.

A residual r corresponding to a difference between the predicted measurement and the actual measurement may be expressed as shown in Equation 7 below, for example. For example, when using a measurement for the j-th feature point, an actual position $\bar{z}_j$ of the j-th feature point measured through the image sensor and a predicted position $\hat{z}_j$ of the j-th feature point may be differentiated as shown in Equation 7. In the following equations, a symbol — denotes an actually measured value and a symbol ^ denotes an estimated value. In addition, when a symbol δ is included, a corresponding value may be an error. Also, when no symbol is included, a corresponding value may be a ground truth.

$$r_j = \bar{z}_j - \hat{z}_j \qquad \text{Equation 7:}$$

In Equation 7, the actual measurement $\bar{z}_j$ may correspond to, for example, a depth-directional position of the feature point measured on a plane having a focal length of 1 in a pinhole camera model. In addition, the predicted measurement $\hat{z}_j$ may be obtained using a position $^c p_{f_j}$ of the j-th feature point viewed at an image frame captured by a camera.

Further, the actual position $\bar{z}_j$ of the j-th feature point measured by the image sensor or the like may be expressed as shown in Equation 8. Also, the predicted depth-directional position $\hat{z}_j$ of the j-th feature point may be expressed as shown in Equation 9 below, for example.

$$\bar{Z}_j = \begin{bmatrix} \bar{u}_j \\ \bar{v}_j \end{bmatrix} \qquad \text{Equation 8}$$

In Equation 8, $\bar{u}_j$ may correspond to an actual position of the j-th feature point on a U axis of an image and $\bar{v}_j$ may correspond to an actual position of the j-th feature point on a V axis of the image. The U axis may correspond to, for example, an X axis, and the V axis may correspond to, for example, a Y axis.

$$\hat{Z}_j = \frac{1}{^c\hat{Z}_j} \begin{bmatrix} ^c\hat{X}_j \\ ^c\hat{Y}_j \end{bmatrix} \qquad \text{Equation 9}$$

In Equation 9, $^c\hat{X}_j$, $^c\hat{Y}_j$, and $^c\hat{Z}_j$ may correspond to estimated 3D position coordinates (x, y, z) of the j-th feature point viewed at an image frame captured by an image sensor such as a camera.

First, an actual measured position $\bar{u}_j$ of the j-th feature point on the U axis, which is represented in Equation 8, may be expressed as a sum of a ground truth $u_j$ and an error $\delta u_j$ of the j-th feature point on the U axis as shown in Equation 10 below, for example.

$$\bar{u}_j = u_j + \delta u_j \qquad \text{Equation 10:}$$

By using Equation 11 below, for example, position coordinates of a feature point on a u axis may be calculated from an estimated 3D position coordinates $\hat{u}_j$ of the feature point.

$$\hat{u}_j = \frac{^c\hat{X}_j}{^c\hat{Z}_j} = \frac{^cX_j + \delta^cX_j}{^cZ_j + \delta^cZ_j} \qquad \text{Equation 11}$$

Here, Equation 11 may indicate that the position coordinates of the j-th feature point on the u axis are calculated from the estimated 3D position coordinates of the j-th feature point, and an estimated value may be expressed as a sum of a ground truth and an error.

An actual measured value of a position of a feature point and a predicted value of a position of the feature point may be expressed as a sum of a ground truth and an error as shown in Equation 10, and then differentiated according to Equation 11, so that a result thereof may be expressed as Equation 12 below, for example.

$$\bar{u}_j - \frac{^c\hat{X}_j}{^c\hat{Z}_j} = u_j + \delta u_j - \frac{^cX_j + \delta^cX_j}{^cZ_j + \delta^cZ_j} \qquad \text{Equation 12}$$

In Equation 12, since $u_j$ and $$\frac{^cX_j}{^cZ_j}$$

are ground truth, a differentiation result of the two values may be zero.

$$u_j = \frac{^cX_j}{^cZ_j} \qquad \text{Equation 13}$$

As shown below, Equation 14 may be obtained by rearranging Equation 12 using Equation 13.

$$\bar{u}_j - \frac{^c\hat{X}_j}{^c\hat{Z}_j} = \delta u_j - \frac{1}{^c\hat{Z}_j}\delta^cX_j + \frac{^c\hat{X}_j}{^c\hat{Z}_j{}^2}\delta^cZ_j + \frac{(u_j\delta^cZ_j - \delta^cX_j)\delta^cZ_j}{^c\hat{Z}_j{}^2} \qquad \text{Equation 14}$$

In Equation 14, $\delta^cX_j$, $\delta^cY_j$, and $\delta^cZ_j$ may correspond to an error of the 3D position coordinates (x, y, z) of the j-th feature point viewed at the captured image frame. $\delta u_j$ may correspond to an error of the ground truth $u_j$ measured at the U axis.

As shown in Equation 14, in a linearized EKF, a last term $$\frac{(u_j\delta^cZ_j - \delta^cX_j)\delta^cZ_j}{^c\hat{Z}_j{}^2}$$

may correspond to a remainder obtained by performing a linear approximation.

An error excluding the last term $$\frac{(u_j\delta^cZ_j - \delta^cX_j)\delta^cZ_j}{^c\hat{Z}_j{}^2}$$

may be expressed as the aforementioned measurement model of Equation 6 as shown in Equations 15 through 17 below, for example.

$$r_u = H_u x + v_u \qquad \text{Equation 15}$$

$$\bar{u}_j - \frac{^c\hat{X}_j}{^c\hat{Z}_j} \cong \begin{bmatrix} -\frac{1}{^c\hat{Z}_j} & 0 & \frac{^c\hat{X}_j}{^c\hat{Z}_j{}^2} \end{bmatrix} \begin{bmatrix} \delta\ ^cX_j \\ \delta\ ^cY_j \\ \delta\ ^cZ_j \end{bmatrix} + \delta u_j \qquad \text{Equation 16}$$

$$v_u \sim N(0, \sigma_{\delta u_j}{}^2) \qquad \text{Equation 17}$$

In Equations 15 through 17, x may correspond to a state error indicating a state of an estimation model $H_u$ with respect to the U axis. $r_u$ may correspond to an error with respect to the measured actual position $\bar{u}_j$ of the j-th feature point on the U axis. $\bar{v}_u$ may correspond to measurement noise (a measurement error) on the U axis. $\sigma_{\delta u_j}{}^2$ may correspond to a variance of the error with respect to the position of the j-th feature point on the U axis.

In general, the EKF may neglect a higher order term. However, when an error is not small, an additional estimation error may be generated due to an influence of the higher order term.

In an example, a higher order term of the linearized EKF may be approximated so as to be taken into consideration as noise of a measurement (e.g., a position of a feature point) which may also be referred to as "measurement noise." Through this, the pose estimation apparatus of one or more embodiments may determine and/or implement a VIO robust to various motion situations to stably estimate a pose. In addition, an uncertainty of an estimation model may be taken into consideration so as to reduce additional noise which may be generated in a fast motion situation. Through this, the pose estimation apparatus of one or more embodiments may reduce dynamic jitter in comparison to the EKF.

The higher order portion $$\frac{(u_j \delta^c Z_j - \delta^c X_j) \delta^c Z_j}{{}^c \hat{Z}_j{}^2}$$

of Equation 14 may be arranged as Equation 18 below, for example.

$$\frac{(u_j \delta^c Z_j - \delta^c X_j) \delta^c Z_j}{{}^c \hat{Z}_j{}^2} = \frac{(\bar{u}_j {}^c \hat{Z}_j - {}^c \hat{X}_j - {}^c \hat{Z}_j \delta u_j) \delta^c Z_j}{{}^c \hat{Z}_j{}^2} = \frac{r_{u,j}}{{}^c \hat{Z}_j} \delta^c Z_j - \frac{\delta u_j \delta^c Z_j}{{}^c \hat{Z}_j}$$

Equation 18

For example, when it is assumed that the measurement noise is a Gaussian distribution, a value of the actual position $\bar{u}_j$ of the j-th feature point received from the front-end 310 may not follow the Gaussian distribution, which may lead to a large error in practice. To prevent this, the error of Equation 18 may be taken into consideration as the measurement noise while neglecting a correlation. The measurement noise may correspond to an error of an estimation model generated in response to a depth-directional position of a feature point being incorrectly estimated.

The error of the estimation model may be taken into consideration as the measurement noise in various ways. For example, the model uncertainty calculator 450 may define a tuning parameter of the estimation model as $\alpha$ or $\alpha$, $\beta$ and then, arrange Equation 15 for updating the state variable as Equation 19 below, for example.

$$r_u = H_u x + v_u + g_u \qquad \text{Equation 19:}$$

Measurement noise $v_u$ may correspond to a variance of an error with respect to the position of the j-th feature point on the U axis as shown in Equation 20 below, for example.

$$v_u \sim N(0, \sigma_{\delta u_j}^2) \qquad \text{Equation 20:}$$

In Equation 20, $g_u$ may correspond to an uncertainty of the estimation model $H_u$.

As shown below, Equation 21 represents the uncertainty of the estimation model along with the tuning parameters $(\alpha, \beta)$ of the estimation model. Also, in Equation 21, the aforementioned errors of Equation 18 are taken into consideration as noise proportional to the tuning parameter while neglecting the correlation.

$$g_u \sim N\left(0, {}^\sigma\left(\alpha \frac{r_u}{{}^c \hat{Z}_j} \sigma_\delta {}^c Z_j\right)^2\right) \text{ or} \qquad \text{Equation 21}$$

$$g_u \sim N\left(0, {}^\sigma\left(\alpha \frac{r_u}{{}^c \hat{Z}_j} \sigma_\delta {}^c Z_j\right)^2 + \left(\beta \frac{{}^\sigma \delta u_j {}^\sigma \delta^c Z_j}{{}^c \hat{Z}_j}\right)^2\right)$$

Like $\bar{u}_j$, with respect to the actual position $\bar{v}_j$ of the j-th feature point on the V axis, the model uncertainty calculator 450 may take the uncertainty $g_u$ of the estimation model into consideration as the measurement noise as shown in Equation 22 below, for example.

$$r_v = H_v x + v_v + g_v \qquad \text{Equation 22:}$$

In Equation 22, x may correspond to a state error indicating a state of an estimation model $H_v$ with respect to the V axis. $r_v$ may correspond to an error with respect to the actual position $\bar{v}_j$ of the j-th feature point on the V axis. $v_v$ may correspond to measurement noise (a measurement error) on the V axis. $g_v$ denotes an uncertainty of the estimation model $H_v$.

The measurement noise $v_v$ may correspond to a variance of an error with respect to the position of the j-th feature point on the V axis as shown in Equation 23 below, for example.

$$v_v \sim N(0, \sigma_{\delta v_j}^2) \qquad \text{Equation 23:}$$

The uncertainty $g_v$ of the estimation model $H_v$ may be taken into consideration as the measurement noise as shown in Equation 24.

$$g_v \sim N\left(0, {}^\sigma\left(\alpha \frac{r_v}{{}^c \hat{Z}_j} \sigma_\delta {}^c Z_j\right)^2\right) \text{ or} \qquad \text{Equation 24}$$

$$g_v \sim N\left(0, {}^\sigma\left(\alpha \frac{r_v}{{}^c \hat{Z}_j} \sigma_\delta {}^c Z_j\right)^2 + \left(\beta \frac{{}^\sigma \delta v_j {}^\sigma \delta^c Z_j}{{}^c \hat{Z}_j}\right)^2\right)$$

Figure 5:
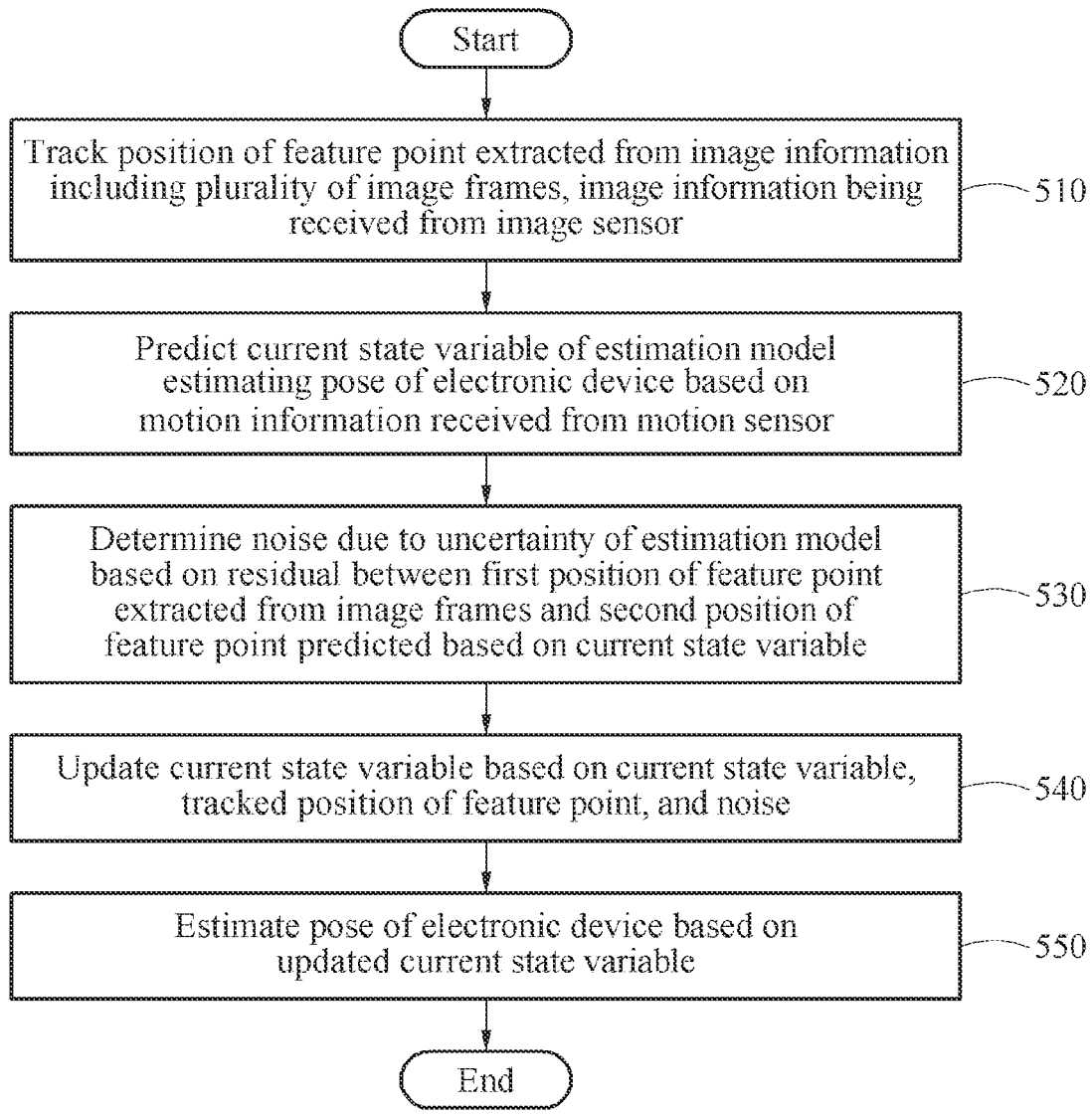
FIG. 5 is a flowchart illustrating an example of a method of estimating a pose.

FIG. 5 is a flowchart illustrating an example of a method of estimating a pose. Hereinafter, operations may be performed in sequence but not necessarily be performed in sequence. For example, the order of operations may be changed, and two or more operations may be performed in parallel.

Referring to FIG. 5, a pose estimation apparatus may estimate a pose of an electronic device through operations 510 through 550.

In operation 510, the pose estimation apparatus may track a position of a feature point extracted from image information including a plurality of image frames, the image information being received from an image sensor. For example, the pose estimation apparatus may extract a second feature point included in a current image frame among the image frames. The pose estimation apparatus may track a position of the second feature point through matching between a first feature point extracted from a previous image frame before the current image frame among the image frames and the second feature point.

In operation 520, the pose estimation apparatus may predict a current state variable of an estimation model estimating a pose of the electronic device based on motion information received from a motion sensor. Based on the motion information, the pose estimation apparatus may predict a current state variable of the estimation model estimating a pose including a position, a velocity, and an orientation of the electronic device. The estimation model may be, for example, an estimation model using a filter-based VIO, but is not limited thereto. The filter may be, for example, a Kalman filter-based filter based on a such as an EKF, a UKF, and an EIF. The current state variable may include a probability distribution corresponding to a current position of the feature point.

For example, in operation 520, based on the motion information and a previous state variable corresponding to a previous image frame among the image frames, the pose estimation apparatus may predict an error covariance of the previous state variable and a current state variable corresponding to a current image frame among the image frames.

In operation 530, the pose estimation apparatus may determine noise due to an uncertainty of the estimation model based on a residual between a first position of a feature point extracted from the image frames and a second position of the feature point predicted based on the current state variable predicted in operation 520. A non-limiting example method of determining the noise due to an uncertainty of the estimation model by the pose estimation apparatus will be described in greater detail with reference to FIG. 6.

In operation 540, the pose estimation apparatus may update the current state variable based on the current state variable predicted in operation 520, the position of the feature point tracked in operation 510, and the noise determined in operation 530. For example, the pose estimation apparatus may update the current state variable based on the current state variable, the error covariance of the previous state variable, the tracked position of the feature point, and the noise.

In operation 550, the pose estimation apparatus may estimate a pose of the electronic device based on the updated current state variable. The electronic device may include at least one of, for example, a wearable device including a smart glass and an HMD including an AR device, a VR device, and an MR device.

Figure 6:
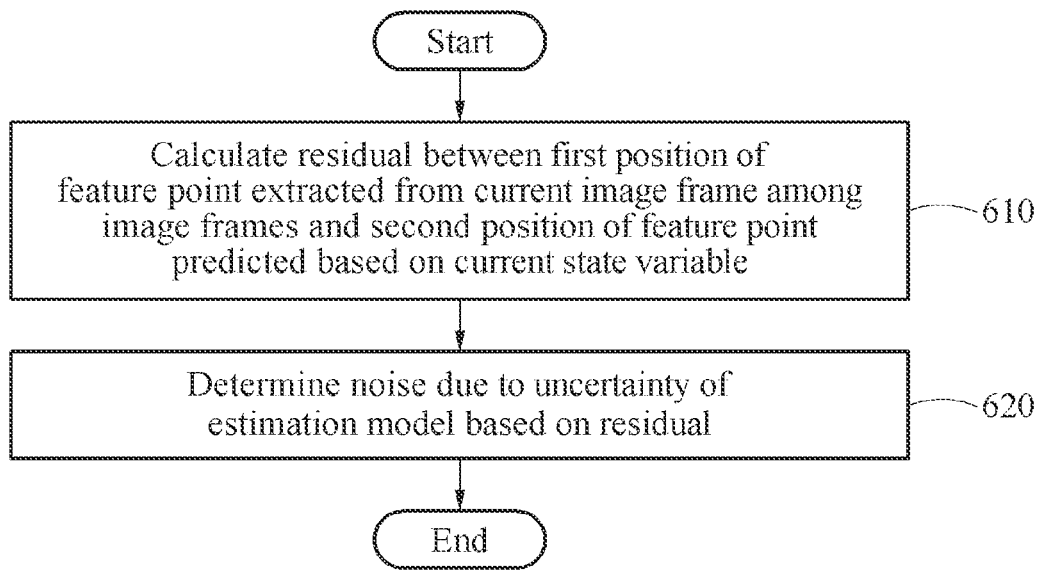
FIG. 6 is a flowchart illustrating an example of a method of determining noise.

FIG. 6 is a flowchart illustrating an example of a method of determining noise. Hereinafter, operations may be performed in sequence but not necessarily be performed in sequence. For example, the order of operations may be changed, and at least two operations may be performed in parallel.

Referring to FIG. 6, a pose estimation apparatus may determine noise due to an uncertainty of an estimation model through operations 610 and 620.

In operation 610, the pose estimation apparatus may calculate a residual between a first position of a feature point extracted from a current image frame among image frames and a second position of the feature point predicted based on a current state variable. For example, the pose estimation apparatus may calculate the residual according to Equation 6.

In operation 620, the pose estimation apparatus may determine noise due to an uncertainty of an estimation model based on the residual calculated in operation 610. The uncertainty of the estimation model may be determined based on an estimation covariance according to a Kalman filter-based SLAM technique, and it is merely an example. The noise due to the uncertainty of the estimation model may correspond to, for example, an error of the estimation model generated in response to a depth-directional position of the feature point being estimated incorrectly.

The pose estimation apparatus may determine the noise by expressing the residual between the first position of the feature point extracted from the current image frame and the second position of the feature point predicted based on the current state variable, as a sum of a ground-truth and an error as shown in Equation 10.

In addition, the pose estimation apparatus may determine the noise by approximating a result of expressing the residual as the sum of the ground-truth and the error, using a tuning parameter of the estimation model.

Figure 7:
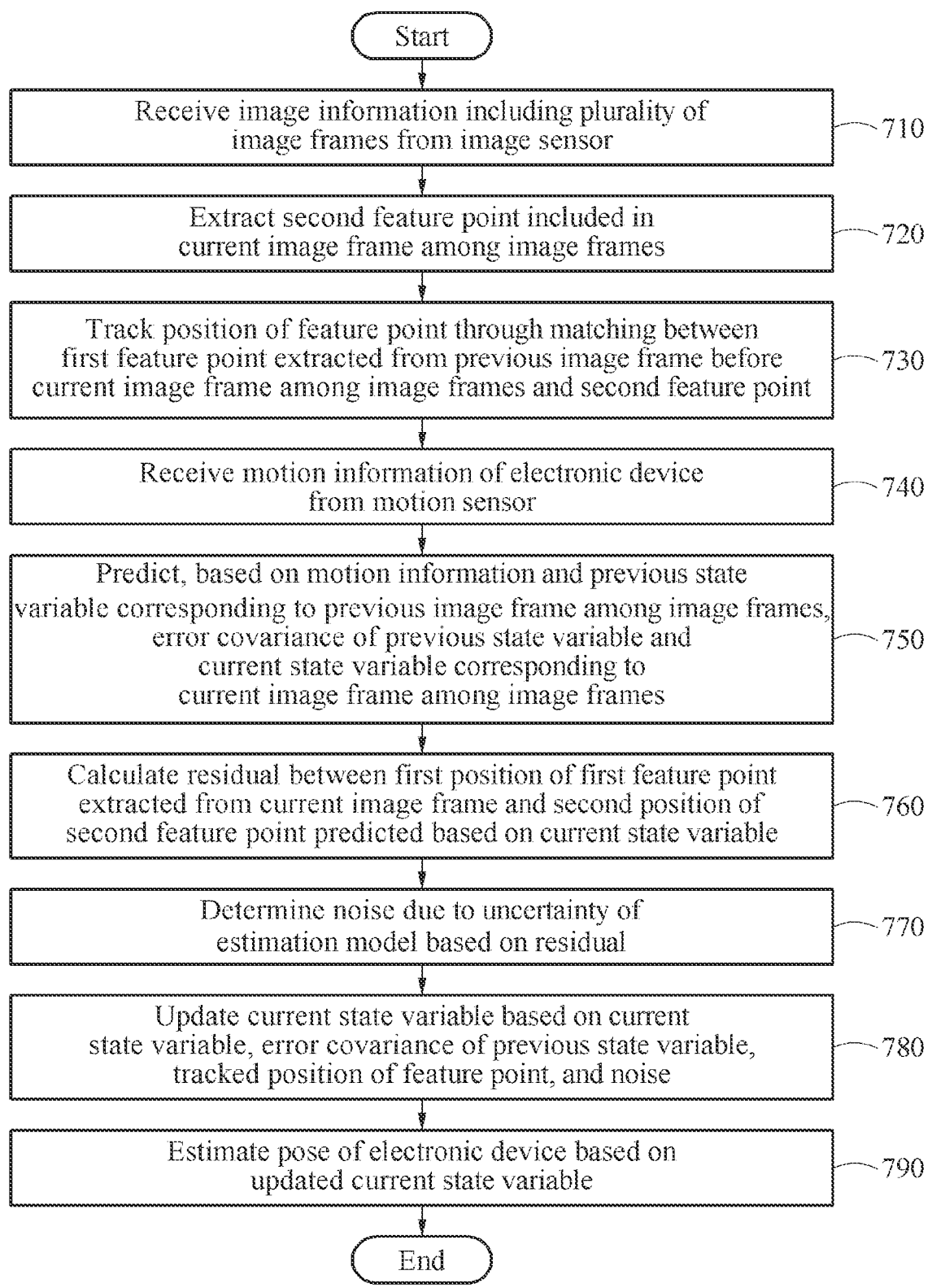
FIG. 7 is a flowchart illustrating an example of a method of estimating a pose.

FIG. 7 is a flowchart illustrating another example of a method of estimating a pose. Hereinafter, operations may be performed in sequence but not necessarily be performed in sequence. For example, the order of operations may be changed, and at least two operations may be performed in parallel.

Referring to FIG. 7, a pose estimation apparatus may estimate a pose of an electronic device through operations 710 through 790. The electronic device may include an image sensor and a motion sensor.

In operation 710, the pose estimation apparatus may receive image information including a plurality of image frames from the image sensor.

In operation 720, the pose estimation apparatus may extract a second feature point included in a current image frame among the image frames.

In operation 730, the pose estimation apparatus may track a position of a feature point through matching between a first feature point extracted from a previous image frame before the current image frame among the image frames and the second feature point.

In operation 740, the pose estimation apparatus may receive motion information of the electronic device from the motion sensor. The electronic device may be the pose estimation apparatus and also be a separate device distinguished from the pose estimation apparatus.

In operation 750, based on the motion information and a previous state variable corresponding to a previous image frame among the image frames, the pose estimation apparatus may predict an error covariance of the previous state variable and a current state variable corresponding to a current image frame among the image frames.

In operation 760, the pose estimation apparatus may calculate a residual between a first position of the first feature point extracted from the current image frame and a second position of the second feature point predicted based on the current state variable.

In operation 770, the pose estimation apparatus may determine noise due to an uncertainty of the estimation model based on the residual.

In operation 780, the pose estimation apparatus may update the current state variable based on the current state variable, the error covariance of the previous state variable, the tracked position of the feature point, and the noise.

In operation 790, the pose estimation apparatus may estimate a pose of the electronic device based on the updated current state variable.

Figure 8:
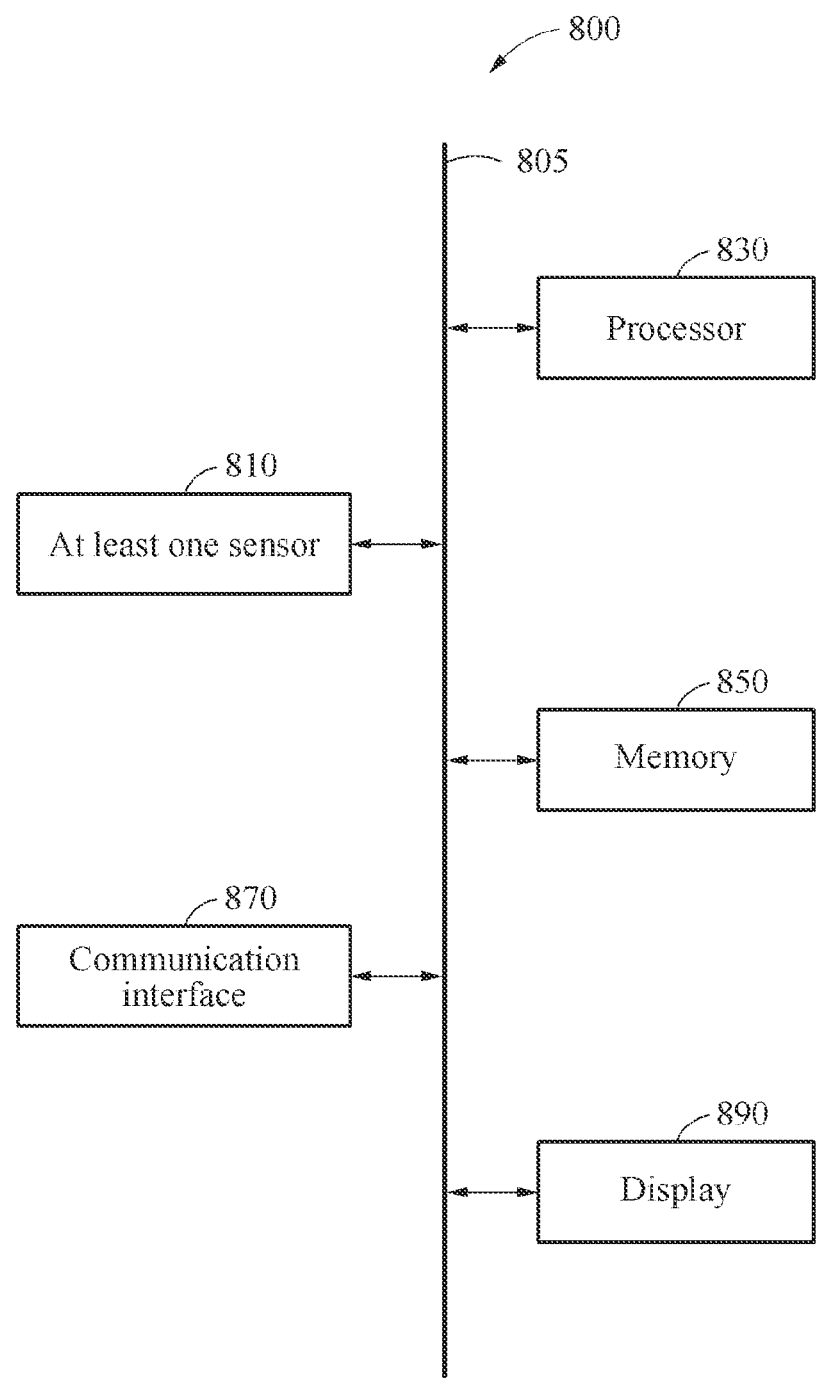
FIG. 8 is a block diagram illustrating an example of a pose estimation apparatus.

FIG. 8 is a block diagram illustrating an example of a pose estimation apparatus. Referring to FIG. 8, a pose estimation apparatus 800 may include at least one sensor 810 (e.g., one or more sensors), a processor 830 (e.g., one or more processors), a memory 850 (e.g., one or more memories), a communication interface 870, and a display 890. The at least one sensor 810, the processor 830, the memory 850, the communication interface 870, and the display 890 may be connected to each other through a communication bus 805.

The at least one sensor 810 may include an image sensor that senses image information including a plurality of image frames and a motion sensor that senses motion information of an electronic device.

The processor 830 may perform any one or more or all of the operations and methods described herein. The processor 830 may track a feature point by extracting the feature point from the image information. The processor 830 may predict a current state variable of an estimation model estimating a pose of the electronic device based on the motion information. The processor 830 may determine noise due to an uncertainty of the estimation model based on a residual between a first position of a feature point extracted from the image frames and a second position of the feature point predicted based on the current state variable. The processor 830 may update the current state variable based on the current state variable, the position of the tracked feature point, and the noise. The processor 830 may estimate a pose of the electronic device based on the updated current state variable.

For example, when the pose estimation apparatus 800 is a wearable electronic device, the processor 830 may create virtual content based on the estimated pose. The virtual content may be, for example, the AR content 210 described above, and other various MR content.

In this example, the display 890 may display the virtual content created by the processor 830.

The processor 830 may execute a program and control the pose estimation apparatus 800. A program code executed by the processor 830 may be stored in the memory 850.

The memory 850 may store the image information and/or motion information sensed by the at least one sensor 810. The memory 850 may store at least one of the noise, the residual, and the current state variable of the estimation model predicted by the processor 830. In addition, the memory 850 may store the current state variable updated by the processor 830, the estimated pose, and/or the virtual content created by the processor 830.

As such, the memory 850 may store a variety of information generated in a processing operation of the processor 830 described above. Also, the memory 850 may store a variety of data and programs, and the like. The memory 850 may include, for example, a volatile memory or a nonvolatile memory. The memory 850 may include a massive storage medium such as a hard disk to store a variety of data.

The communication interface 870 may receive information sensed by the at least one sensor 810. The communication interface 870 may externally transmit the pose of the electronic device predicted by the processor 830.

The pose estimation apparatus 800 may selectively include the display 890. For example, when the pose estimation apparatus 800 is the wearable electronic device, the pose estimation apparatus 800 may match a virtual content object and a real object based on a pose of the wearable electronic device estimated by the processor 830 through the above-described process. In this example, the display 890 visualizes the virtual content object and the real object matched by the processor 830. The display 890 may be, for example, a display and/or a flexible display, but is not limited thereto. In this case, a result of the matching may be displayed on the display 890.

The pose estimation apparatus 800 may correspond to a device of various fields, for example, an advanced driver assistance system (ADAS), a head up display (HUD) device, a 3D digital information display (DID), a navigation device, a neuromorphic device, a 3D mobile device, a smartphone, a smart television (TV), a smart vehicle, an Internet of things (IoT) device, a medical device, a measurement device, and the like. The 3D mobile device may be understood as concepts including, for example, a display device, an HMD, an FMD, and AR glasses for displaying the AR, the VR, and/or the MR.

In addition, the processor 830 may perform at least one of the methods described above with reference to FIGS. 1 through 7 or a technique corresponding to at least one of the methods. The processor 830 may be a hardware-implemented pose estimation apparatus having a circuit that is physically structured to execute desired operations. For example, the desired operations may include code or instructions included in a program. The pose estimation apparatus implemented as hardware may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural network processing unit (NPU).

The electronic devices, displays, pose estimation apparatuses, image sensors, motion sensors, feature point extracting and tracking parts, motion information acquirers, state predictors, measurement updaters, model uncertainty calculators, sensors, processors, memories, communication interfaces, displays, communication buses, electronic device 110, display 115, pose estimation apparatus 400, image sensor 401, motion sensor 403, feature point extracting and tracking part 410, motion information acquirer 420, state predictor 430, measurement updater 440, model uncertainty calculator 450, pose estimation apparatus 800, sensor 810, processor 830, memory 850, communication interface 870, display 890, communication bus 805, and other apparatuses, units, modules, devices, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with pose estimation, the method comprising:
    tracking a position of a feature point extracted from image information comprising a plurality of image frames, the image information being received from an image sensor;
    predicting a current state variable of an estimation model for determining a pose of an electronic device, based on motion information received from a motion sensor and an error covariance of a previous state variable and the current state variable;
    determining noise due to an uncertainty of the estimation model based on a residual between a first position of the feature point extracted from the image frames and a second position of the feature point predicted based on the current state variable;
    updating the current state variable based on the current state variable, the tracked position of the feature point, and the noise; and
    determining the pose of the electronic device based on the updated current state variable.

2. The method of claim 1, wherein the determining of the noise comprises:
    determining the residual between the first position of the feature point extracted from a current image frame among the image frames and the second position of the feature point predicted based on the current state variable; and
    determining the noise due to the uncertainty of the estimation model based on the residual.

3. The method of claim 2, wherein the determining of the noise comprises determining the noise by expressing, as a sum of a ground-truth and an error, the residual between the first position of the feature point extracted from the current image frame and the second position of the feature point predicted based on the current state variable.

4. The method of claim 3, wherein the determining of the noise comprises determining the noise by approximating a result of expressing the residual as the sum of the ground-truth and the error, using a tuning parameter of the estimation model.

5. The method of claim 1, wherein the uncertainty of the estimation model is determined using an estimation covariance according to a simultaneous localization and mapping (SLAM) technique based on an extended Kalman filter.

6. The method of claim 1, wherein the predicting of the current state variable comprises predicting, based on the motion information and a previous state variable corresponding to a previous image frame among the image frames, the error covariance of the previous state variable and the current state variable corresponding to a current image frame among the image frames.

7. The method of claim 6, wherein the updating of the current state variable comprises updating the current state variable based on the current state variable, the error covariance of the previous state variable, the tracked position of the feature point, and the noise.

8. The method of claim 1, wherein the tracking of the position of the feature point comprises:
 extracting a second feature point included in a current image frame among the image frames; and
 tracking a position of the second feature point through matching between a first feature point extracted from a previous image frame before the current image frame among the image frames and the second feature point.

9. The method of claim 1, wherein the estimation model comprises an estimation model using a filter-based visual-inertial odometry (VIO).

10. The method of claim 1, wherein the electronic device comprises either one or both of:
 a wearable device comprising a smart glass; and
 a head-mounted device (HMD) comprising any one or any combination of any two or more of an augmented reality (AR) device, a virtual reality (VR) device, and a mixed reality (MR) device.

11. A non-transitory computer-readable storage medium storing instructions that, when executed by one or more processors, configure the one or more processors to perform the method of claim 1.

12. An apparatus with pose estimation, the apparatus comprising:
 an image sensor configured to sense image information comprising a plurality of image frames;
 a motion sensor configured to sense motion information of an electronic device; and
 one or more processors configured to:
  track a feature point by extracting the feature point from the image information;
  predict a current state variable of an estimation model for determining a pose of the electronic device based on the motion information and an error covariance of a previous state variable and the current state variable;
  determine noise due to an uncertainty of the estimation model based on a residual between a first position of the feature point extracted from the image frames and a second position of the feature point predicted based on the current state variable;
  update the current state variable based on the current state variable, a position of the tracked feature point, and the noise; and
  determine the pose of the electronic device based on the updated current state variable.

13. The apparatus of claim 12, wherein, for the determining of the noise, the one or more processors are configured to:
 determine the residual between the first position of the feature point extracted from a current image frame among the image frames and the second position of the feature point predicted based on the current state variable; and
 determine the noise due to the uncertainty of the estimation model based on the residual.

14. The apparatus of claim 13, wherein, for the determining of the noise, the one or more processors are configured to determine the noise by expressing, as a sum of a ground-truth and an error, the residual between the first position of the feature point extracted from the current image frame and the second position of the feature point predicted based on the current state variable.

15. The apparatus of claim 14, wherein, for the determining of the noise, the one or more processors are configured to determine the noise by approximating a result of expressing the residual as the sum of the ground-truth and the error, using a tuning parameter of the estimation model.

16. The apparatus of claim 12, wherein the uncertainty of the estimation model is determined using an estimation covariance according to a simultaneous localization and mapping (SLAM) technique based on an extended Kalman filter.

17. The apparatus of claim 12, wherein, for the predicting of the current state variable, the one or more processors are configured to predict, based on the motion information and a previous state variable corresponding to a previous image frame among the image frames, the error covariance of the previous state variable and the current state variable corresponding to a current image frame among the image frames.

18. The apparatus of claim 17, wherein, for the updating of the current state variable, the one or more processors are configured to update the current state variable based on the current state variable, the error covariance of the previous state variable, the position of the tracked feature point, and the noise.

19. The apparatus of claim 12, wherein, for the tracking of the position of the feature point, the one or more processors are configured to:
 extract a second feature point included in a current image frame among the image frames; and
 track a position of the second feature point through matching between a first feature point extracted from a previous image frame before the current image frame among the image frames and the second feature point.

20. The apparatus of claim 12, wherein the estimation model comprises an estimation model using a filter-based visual-inertial odometry (VIO).

21. The apparatus of claim 12, wherein the electronic device comprises either one or both of:
 a wearable device comprising a smart glass; and
 a head-mounted device (HMD) comprising any one or any combination of any two or more of an augmented reality (AR) device, a virtual reality (VR) device, and a mixed reality (MR) device.

22. A wearable electronic device comprising:
an image sensor configured to sense image information comprising a plurality of image frames;
a motion sensor configured to sense motion information of the wearable electronic device;
one or more processors configured to:
- track a feature point by extracting the feature point from the image information;
- predict a current state variable of an estimation model for determining a pose of the wearable electronic device based on the motion information and an error covariance of a previous state variable and the current state variable;
- determine noise due to an uncertainty of the estimation model based on a residual between a first position of the feature point extracted from the image frames and a second position of the feature point predicted based on the current state variable;
- update the current state variable based on the current state variable, a position of the tracked feature point, and the noise;
- determine the pose of the wearable electronic device based on the updated current state variable; and
- generate virtual content based on the determined pose; and a display configured to display the virtual content.

23. A processor-implemented method with pose estimation, the method comprising:
- predicting a current state variable of an estimation model for determining a pose of an electronic device, based on an error covariance of a previous state variable and the current state variable;
- determining noise due to an uncertainty of the estimation model based on a residual between a first position of a feature point extracted from image frames and a second position of the feature point predicted based on the current state variable;
- updating the current state variable based on the noise; and
- determining the pose of the electronic device based on the updated current state variable.

24. The method of claim 23, wherein the current state variable comprises a state variable corresponding to a motion sensor and a state variable corresponding to an image sensor.

25. The method of claim 24, wherein the state variable corresponding to the motion sensor comprises any one or any combination of any two or more of an orientation error of an image frame among the image frames, a bias error of the motion sensor, a velocity error, an acceleration bias error, and a position error.

26. The method of claim 24, wherein the state variable corresponding to the image sensor comprises an error of a position of a feature point viewed at an image frame of the image frames.

* * * * *